United States Patent Office 2,807,626
Patented Sept. 24, 1957

2,807,626

SALT OF AMINO ACID

William G. Skelly, Northbrook, Ill., assignor to International Minerals & Chemical Corporation, a corporation of New York No Drawing. Application September 13, 1954,
Serial No. 455,777

9 Claims. (Cl. 260—326.3)

This invention concerns the preparation of a metal salt of pyrrolidonecarboxylic acid, and more particularly, to the preparation of the ferrous salt of pyrrolidonecarboxylic acid.

Ferrous pyrrolidonecarboxylate has been prepared in the past by refluxing pyrrolidonecarboxylic acid with iron filings, but the yield was low and the method has little practical utility. The ferrous salt of pyrrolidonecarboxylic acid is also produced when glutamic acid is refluxed with iron filings, but this procedure is likewise not a satisfactory procedure for producing this compound.

Ferrous pyrrolidonecarboxylate has pharmaceutical value and is known to be useful for the treatment of human beings having an iron deficiency.

It is an object of the instant invention to provide an improved process for the preparation of ferrous pyrrolidonecarboxylate.

It is a further object of the instant invention to provide a process for the preparation of substantially pure ferrous pyrrolidonecarboxylate.

It is a further object of the instant invention to provide a process for the production of substantially pure ferrous pyrrolidonecarboxylate suitable for pharmaceutical purposes.

Still another object of the instant invention is to provide a process for the production of ferrous pyrrolidonecarboxylate in high yield.

These and other objects of the instant invention will become more apparent from the description of the invention below.

In accordance with this invention, an alkaline earth metal salt of pyrrolidonecarboxylic acid, such as barium pyrrolidonecarboxylic acid or calcium pyrrolidonecarboxylic acid, is reacted with a ferrous salt in the presence of metallic iron in an atmosphere of a non-oxidizing gas to form the ferrous salt of pyrrolidonecarboxylic acid. The process is applicable to L-pyrrolidonecarboxylic acid, D-pyrrolidonecarboxylic acid, and to racemic mixtures thereof in preparing the L-, D-, and DL- forms of ferrous pyrrolidonecarboxylate. Ferrous L-pyrrolidonecarboxylate is most useful.

In one embodiment of the instant invention, an alkaline earth metal salt of pyrrolidonecarboxylic acid, such as barium pyrrolidonecarboxylate, is decomposed by a water-soluble ferrous salt, the anion of which forms a water-insoluble salt with the alkaline earth metal, in the presence of metallic iron and in an atmosphere of a non-oxidizing gas which is inert under the reaction conditions obtaining. The insoluble alkaline earth metal salt is separated from the ferrous pyrrolidonecarboxylate solution by any convenient means in a non-oxidizing atmosphere, for example by filtration. The solution from which the salt has been separated is then evaporated to complete dryness to obtain the ferrous pyrrolidonecarboxylate product. The product is substantially pure and free from contamination with by-products.

In another embodiment of the instant invention, barium pyrrolidonecarboxylate prepared by heating barium hydroxide and an aqueous suspension of pyrrolidonecarboxylic acid in the presence of metallic iron is reacted with ferrous sulfate in an inert non-oxidizing atmosphere, preferably a nitrogen atmosphere. After the reaction forming the ferrous salt of pyrrolidonecarboxylic acid has been completed, the insoluble barium salt is separated in an inert non-oxidizing atmosphere, such as nitrogen or carbon dioxide by filtration. It is preferred to displace the nitrogen atmosphere with a carbon dioxide atmosphere which performs the functions of protecting the products from oxygen and of reacting with any residual barium present in the solution to form an insoluble salt. The precipitate is washed with carbonated water which is free from air and the resulting filtrate and wash water are evaporated to complete dryness under reduced pressure to obtain the ferrous salt of pyrrolidonecarboxylic acid.

In another embodiment of the instant invention, calcium pyrrolidonecarboxylate is decomposed with a ferrous salt, for example, calcium pyrrolidonecarboxylate prepared by reacting calcium hydroxide and pyrrolidonecarboxylic acid in an inert nonoxidizing atmosphere, such as nitrogen, preferably in the presence of a small amount of iron filings, is reacted with ferrous sulfate in the presence of an additional quantity of iron filings in an aqueous medium. After the reaction has proceeded to substantial equilibrium, the nitrogen atmosphere is preferably replaced with an atmosphere of carbon dioxide. The insoluble calcium salt of pyrrolidonecarboxylic acid is separated from the reaction products by filtration while maintaining a carbon dioxide atmosphere. The resulting solution is evaporated to dryness under reduced pressure to obtain ferrous pyrrolidonecarboxylate.

In a specific embodiment of the instant invention, about 1 mole of pyrrolidonecarboxylic acid and about 0.5 mole of barium hydroxide in aqueous medium is heated to between about 90° C. and about 105° C. in the presence of between about 5% and about 25% of a filter aid, such as a diatomaceous earth, and between about 1% and about 10% (based on the weight of pyrrolidonecarboxylic acid calculated as its barium salt) of metallic iron having a mesh size between about 20 and about 60. The reaction is carried out in an atmosphere of nitrogen. After the barium pyrrolidonecarboxylate-forming reaction has proceeded to substantial equilibrium, a mixture containing about 0.5 mole of ferrous sulfate dissolved in water and between about 0.01% and about 0.1% of iron filings are added to the barium pyrrolidonecarboxylic acid. The atmosphere of nitrogen is then replaced with an atmosphere of carbon dioxide, and barium sulfate which precipitates from the reaction product mixture is separated by filtration under an atmosphere of carbon dioxide. The barium sulfate precipitate is washed with carbonated water which is free from air. The resulting liquor which has been separated from the barium sulfate is then evaporated under reduced pressure to complete dryness to obtain ferrous pyrrolidonecarboxylate.

The following example illustrates a specific embodiment of the invention. All parts and percentages are by weight unless otherwise indicated.

*Example*

A reaction vessel was charged with a solution of 64.5 parts of L-pyrrolidonecarboxylic acid dissolved in 300 parts of water and 78.88 parts of barium hydroxide octahydrate was added with stirring. The reaction vessel was flushed out with nitrogen gas to create a nitrogen atmosphere over the reaction mixture. Then 7.5 parts of iron filings (40 mesh) and a solution of 69.5 parts of ferrous sulfate (heptahydrate) dissolved in 150 parts of water were added. The nitrogen atmosphere was then displaced with carbon dioxide following which barium sulfate was filtered off under an atmosphere of carbon dioxide. The filtrate containing ferrous pyrrolidonecarboxylate was evaporated to dryness to yield 64.5 parts of ferrous L-pyrrolidonecarboxylate having the following analysis:

|  | Ferrous L-pyrrolidonecarboxylate monohydrate | |
|---|---|---|
|  | Theory | Found |
| Fe_____percent__ | 16.7 | 16.36 |
| N_____do____ | 8.26 | 8.28 |
| H$_2$O_____do____ | 5.48 | 4.5 |
| CA_____do____ | 0 | 0.02 |
| Yield_____gm__ | 82 | 64.5 (78.7%) |

Having thus fully described and illustrated the character of the instant invention, what is desired to be protected by Letters Patent is:

1. A process for preparing ferrous pyrrolidonecarboxylate which comprises reacting an alkaline earth metal salt of pyrrolidonecarboxylic acid with a water-soluble inorganic ferrous salt, the anion of which forms a water insoluble salt with the alkaline earth metal, in the presence of metallic iron in an atmosphere of a non-oxidizing gas inert under the reaction conditions obtaining.

2. A process for the preparation of ferrous L-pyrrolidonecarboxylate which comprises reacting an alkaline earth metal salt of L-pyrrolidonecarboxylic acid selected from the group consisting of calcium and barium L-pyrrolidonecarboxylate with a water-soluble inorganic ferrous salt, the anion of which forms a water-insoluble salt with the alkaline earth metal, in the presence of metallic iron and in an atmosphere of a non-oxidizing gas inert under the reaction conditions obtaining.

3. The process of claim 2 wherein the metallic iron is utilized in an amount between about 1% and about 10% based upon the weight of alkaline earth salt of L-pyrrolidonecarboxylic acid.

4. The process of claim 2 wherein the alkaline earth metal is calcium and the ferrous salt is ferrous sulfate.

5. The process of claim 4 wherein the metallic iron is utilized in an amount between about 1% and about 10% based upon the weight of the calcium salt of L-pyrrolidonecarboxylic acid.

6. A process for the production of ferrous L-pyrrolidonecarboxylate which comprises heating calcium hydroxide, L-pyrrolidonecarboxylic acid, and a filter aid in an aqueous suspension in the presence of between about 1% and about 10% metallic iron based upon the weight of L-pyrrolidonecarboxylic acid in the form of its calcium salt in a nitrogen atmosphere at a temperature between about 90° C. and about 105° C., adding ferrous sulfate and metallic iron to the resulting mixture, replacing the nitrogen atmosphere with an atmosphere of carbon dioxide, separating calcium sulfate from the resulting solution and evaporating the solution to dryness.

7. A process for the preparation of ferrous L-pyrrolidonecarboxylate which comprises reacting barium L-pyrrolidonecarboxylate with a water-soluble inorganic ferrous salt, the anion of which forms a water-insoluble salt with barium, in the presence of metallic iron and in an atmosphere of a non-oxidizing gas inert under the reaction conditions obtaining.

8. The process of claim 7 in which the metallic iron is utilized in an amount between about 1% and about 10% based upon the weight of barium L-pyrrolidonecarboxylate.

9. A process for the production of ferrous L-pyrrolidonecarboxylate which comprises heating barium hydroxide, L-pyrrolidonecarboxylic acid, and a filter aid in an aqueous suspension in the presence of between about 1% and about 10% metallic iron based upon the weight of L-pyrrolidonecarboxylic acid in the form of its barium salt, in a nitrogen atmosphere at a temperature between about 90° C. and about 105° C., adding ferrous sulfate and metallic iron to the resulting mixture, replacing the nitrogen atmosphere with an atmosphere of carbon dioxide, separating barium sulfate from the resulting solution and evaporating the solution to dryness.

References Cited in the file of this patent

UNITED STATES PATENTS

| 2,474,989 | Schnider | July 5, 1949 |

FOREIGN PATENTS

| 264,391 | Germany | Mar. 7, 1913 |